US010595666B2

(12) United States Patent
Trombetta et al.

(10) Patent No.: US 10,595,666 B2
(45) Date of Patent: Mar. 24, 2020

(54) CAPSULE MACHINE AND COMPONENTS

(71) Applicant: 2266170 Ontario Inc., Mississauga (CA)

(72) Inventors: Liberatore A. Trombetta, Ancaster (CA); Yucheng Fu, Mississauga (CA); Scott Hanneson, Mississauga (CA)

(73) Assignee: 2266170 Ontario Inc., Mississauga (CA)

( * ) Notice: Subject to any disclaimer, the term of this patent is extended or adjusted under 35 U.S.C. 154(b) by 337 days.

(21) Appl. No.: 15/529,295

(22) PCT Filed: Nov. 24, 2015

(86) PCT No.: PCT/CA2015/051218
§ 371 (c)(1),
(2) Date: May 24, 2017

(87) PCT Pub. No.: WO2016/082029
PCT Pub. Date: Jun. 2, 2016

(65) Prior Publication Data
US 2017/0258265 A1  Sep. 14, 2017

Related U.S. Application Data

(60) Provisional application No. 62/083,474, filed on Nov. 24, 2014.

(51) Int. Cl.
*A47J 31/44* (2006.01)
*A47J 31/40* (2006.01)
(Continued)

(52) U.S. Cl.
CPC ......... *A47J 31/407* (2013.01); *A47J 31/3628* (2013.01); *A47J 31/3695* (2013.01);
(Continued)

(58) Field of Classification Search
CPC ............... A47J 31/4482; A47J 31/0642; A47J 31/0652; A47J 31/0668; A47J 31/3628;
(Continued)

(56) References Cited

U.S. PATENT DOCUMENTS 3,260,190 A * 7/1966 Levinson ............ A47J 31/0642
222/83.5
6,026,732 A * 2/2000 Kollep ................ A47J 31/0668
99/295

(Continued)

FOREIGN PATENT DOCUMENTS

WO  WO-2009050540 A1 *  4/2009  .......... A47J 31/3628
WO  2009/092628 A1  7/2009
WO  2014/056862 A1  4/2014

OTHER PUBLICATIONS

International Search Report for International Application No. PCT/CA2015/051218 dated Feb. 5, 2016.

*Primary Examiner* — Reginald Alexander
(74) *Attorney, Agent, or Firm* — Katten Muchin Rosenman LLP

(57) ABSTRACT

A machine for preparing a product from a capsule that contains desired ingredients is provided. The machine includes a housing, a brew chamber disposed in the housing for holding a capsule and an injection system adapted for injecting a fluid into said capsule. In one embodiment, the injection system has a plurality of injection nozzles that are each adapted for piercing a lid of a capsule. In another embodiment, the brew chamber has at least one movable portion that is adapted to move to receive different sized capsules.

24 Claims, 10 Drawing Sheets

(51) Int. Cl.
*A47J 31/46* (2006.01)
*A47J 31/36* (2006.01)

(52) U.S. Cl.
CPC ............ *A47J 31/44* (2013.01); *A47J 31/4482* (2013.01); *A47J 31/46* (2013.01)

(58) Field of Classification Search
CPC . A47J 31/3623; A47J 31/3695; A47J 31/3676
USPC .................................................. 99/284, 295
See application file for complete search history.

(56) References Cited

U.S. PATENT DOCUMENTS

| | | | |
|---|---|---|---|
| 2006/0225575 A1* | 10/2006 | Denisart | ............. A47J 31/3695 99/275 |
| 2012/0111887 A1 | 5/2012 | Smeller et al. | |
| 2015/0201791 A1* | 7/2015 | Tinkler | ............. B65D 85/8043 426/431 |

\* cited by examiner

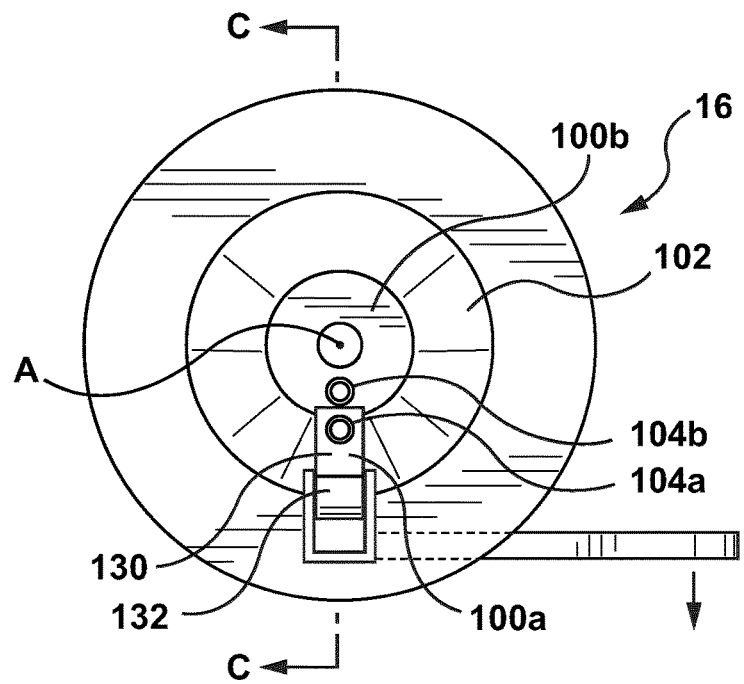
FIG. 11a
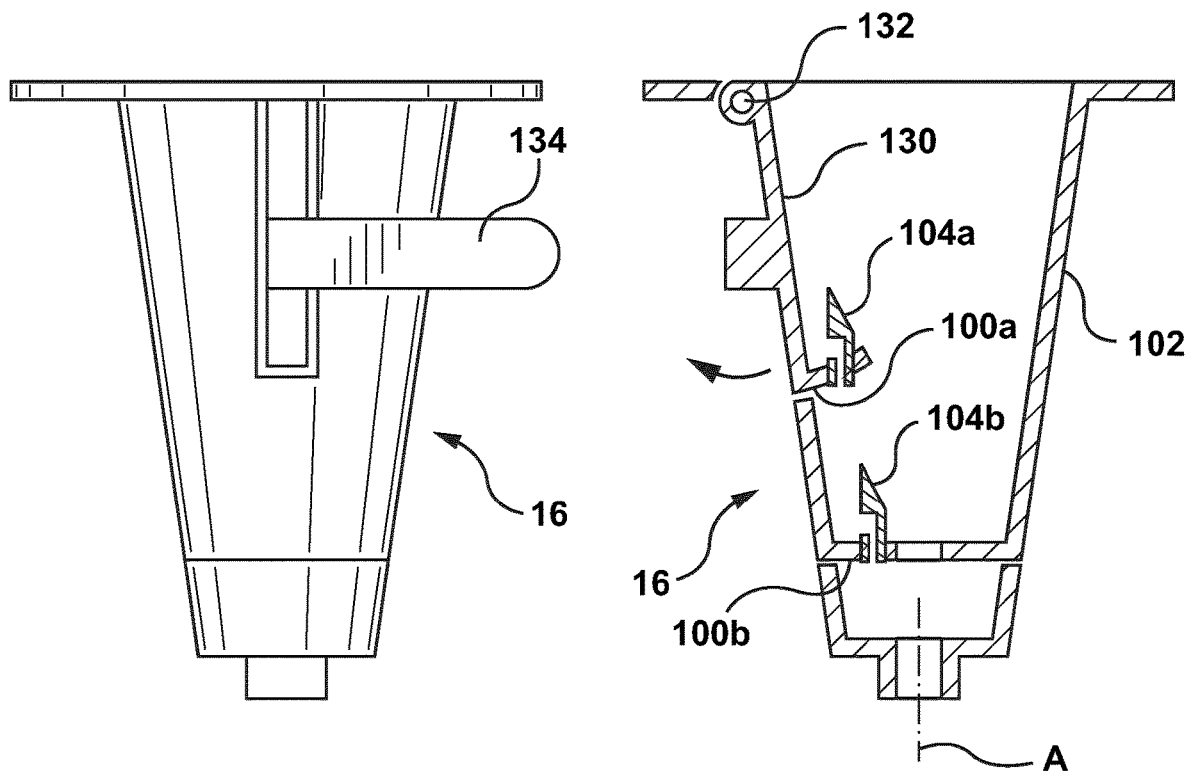
FIG. 11b
FIG. 11c

A-A

B-B

US 10,595,666 B2

CAPSULE MACHINE AND COMPONENTS

FIELD

This specification relates to machines for preparing products from capsules, and in particular to machines that are adapted for use with different sizes of capsules.

BACKGROUND

The following background discussion is not an admission that anything discussed below is citable as prior art or common general knowledge. The documents listed below are incorporated herein in their entirety by this reference to them.

Capsules adapted for use in machines to prepare a desired consumable product are becoming increasingly popular. Such capsules come in a variety of formats most typically for producing beverages such as espresso coffee, drip coffee, tea, hot chocolate or soup.

Capsule machines typically include a brew chamber that is adapted to receive a single size of capsule. This is problematic as more sizes of capsules enter the market place. A consumer for example may wish to use a smaller size capsule to prepare a single serving of a desired product (for example a cup of coffee) or a larger size capsule to prepare multiple servings of a desired product (such as a carafe of coffee). Larger size capsules are also suited to prepare products that contain insoluble ingredients such as noodles.

Capsule machines also typically include an injection system comprising a single nozzle that is adapted to pierce the lid of a capsule along a central axis to inject a fluid, such as heated water, into the capsule. A problem with such systems is that the single nozzle may not adequately disperse fluid over the ingredients disposed in the capsule. This problem is made worse when capsules of greater diameter are utilized.

There is a need for a capsule machine having a brew chamber that is adapted to receive different sizes of capsules.

There is also a need for a capsule machine having an injection system that is adapted to disperse fluid into the capsule over a wider area than conventional injection systems.

SUMMARY

In one aspect, the invention provides a machine for preparing a product from a capsule that contains desired ingredients, the machine comprising:
a housing;
a brew chamber adapted for holding a capsule;
an injection system adapted for injecting a fluid into said capsule, said injection system having a plurality of injection nozzles that are each adapted for piercing a lid of said capsule;
a fluid transfer system adapted for transferring a desired fluid from a fluid source to said injection system; and
a dispensing system adapted for dispensing product from said capsule to a desired receptacle.

In another aspect, the invention provides a machine for preparing a product from a capsule that contains desired ingredients, the machine comprising:
a housing;
a brew chamber adapted for holding a capsule, said brew chamber including at least one movable portion that is adapted to move to receive different sizes of capsules;
an injection system adapted for injecting a fluid into said capsule;
a fluid transfer system adapted for transferring a desired fluid from a fluid source to said injection system; and
a dispensing system adapted for dispensing product from said capsule to a desired receptacle.

In another aspect the invention provides an injection system for a machine used for preparing a product from a capsule that contains desired ingredients, the injection system comprising a plurality of injection nozzles that are each adapted for piercing a lid of a capsule, each said injection nozzle having at least one opening that is adapted to inject fluid into said capsule in a desired direction.

In another aspect the invention provides a brew chamber for a machine used for preparing a product from a capsule that contains desired ingredients, the brew chamber comprising at least one movable portion that is adapted to move according to the dimensions of said capsule.

Other aspects and features of the teachings disclosed herein will become apparent, to those ordinarily skilled in the art, upon review of the following description of the specific examples of the specification.

DRAWINGS

The drawings included herewith are for illustrating various examples of articles, methods, and apparatuses of the present specification and are not intended to limit the scope of what is taught in any way. For simplicity and clarity of illustration, where considered appropriate, reference numerals may be repeated among the drawings to indicate corresponding or analogous elements.

FIG. 11a is a top view of another embodiment of brew chamber for the capsule machine of FIG. 1;

FIG. 11b is a side view of the brew chamber shown in FIG. 11a;

FIG. 11c is a sectional view of the brew chamber of FIG. 11a as viewed along line C-C;

DESCRIPTION OF VARIOUS EMBODIMENTS

Various apparatuses or methods will be described below to provide examples of the claimed invention. The claimed invention is not limited to apparatuses or methods having all of the features of any one apparatus or method described below or to features common to multiple or all of the apparatuses described below. The claimed invention may reside in a combination or sub-combination of the apparatus elements or method steps described below. It is possible that an apparatus or method described below is not an example of the claimed invention. The applicant(s), inventor(s) and/or owner(s) reserve all rights in any invention disclosed in an apparatus or method described below that is not claimed in this document and do not abandon, disclaim or dedicate to the public any such invention by its disclosure in this document.

Figure 1:
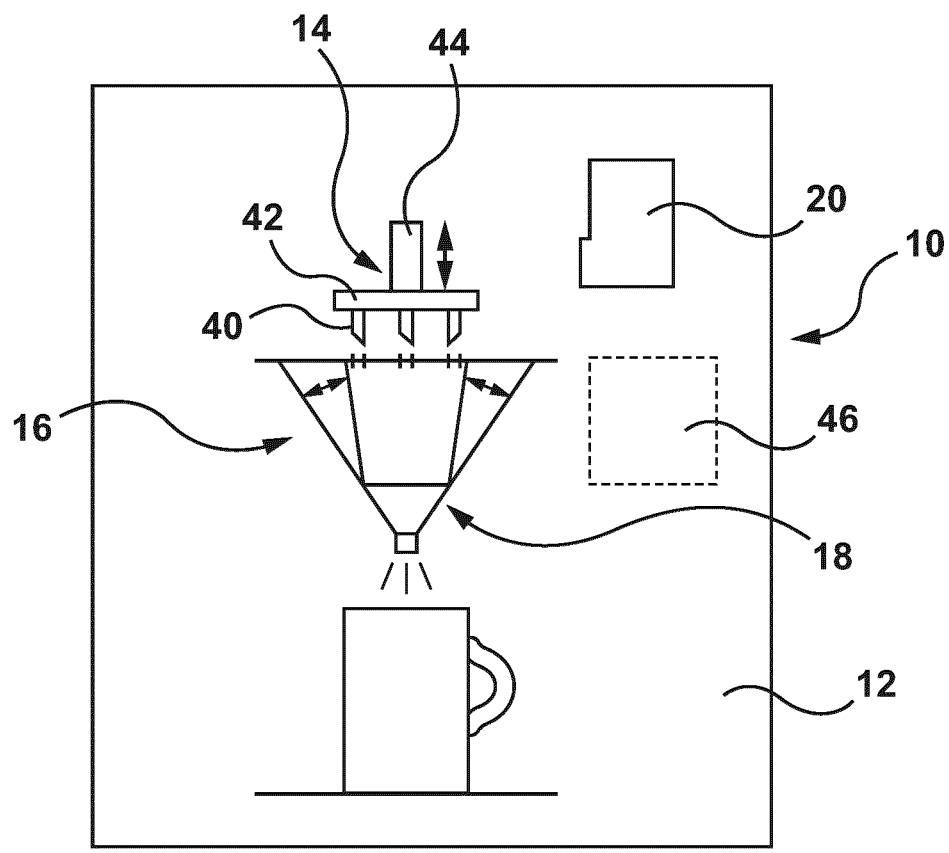
FIG. 1 is a schematic view of a capsule machine in accordance with the present invention.

A capsule machine is shown generally at 10 in FIG. 1. Capsule machine includes a housing 12 containing an injection system 14, brew chamber 16, dispensing system 18 and control interface 20.

Figure 2A:
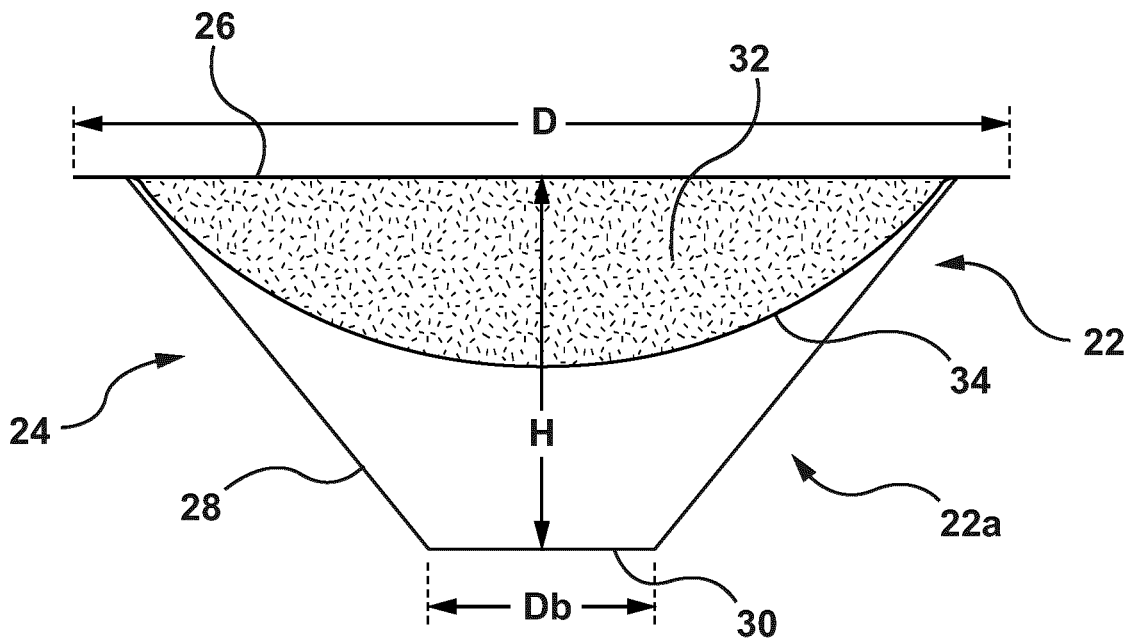
FIGS. 2a and 2b are vertical sectional views of larger and smaller size capsules, respectively, that are adapted for use with the present invention.
Figure 2B:
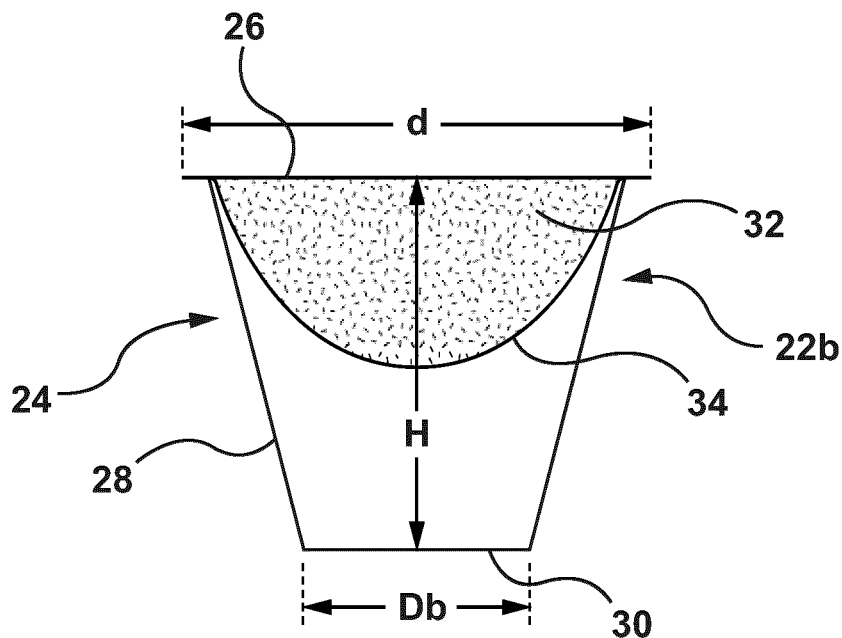

Capsule machine 10 is adapted to receive a capsule 22 (such as shown in FIGS. 2a and 2b) having a body 24 and a lid 26. Body 24 has a sidewall 28 terminating in a base 30. Capsule 22 contains ingredients 32 that are adapted to prepare a desired product when mixed with a desired fluid (such as heated water). Ingredients 32 may be contained within a filter 34 that is disposed within capsule 22 to prevent ingredients 32 from being dispensed from capsule 22 during preparation of the desired product.

Capsule 22 is available in different sizes as shown in FIGS. 2a and 2b. A larger size capsule 22a, as shown in FIG. 2a, has a larger diameter D at lid 26 compared to a smaller size capsule 22b having a smaller diameter d at lid 26, as shown in FIG. 2b. In one embodiment, capsules 22a and 22b have the same height H from lid 26 to base 30. Capsules 22a and 22b also have the same diameter Db at base 30. By keeping the height H and base diameter Db of capsules 22a and 22b the same, the relative position of injection system 14 and dispensing system 18 within machine 10 may be kept the same.

Figure 3:
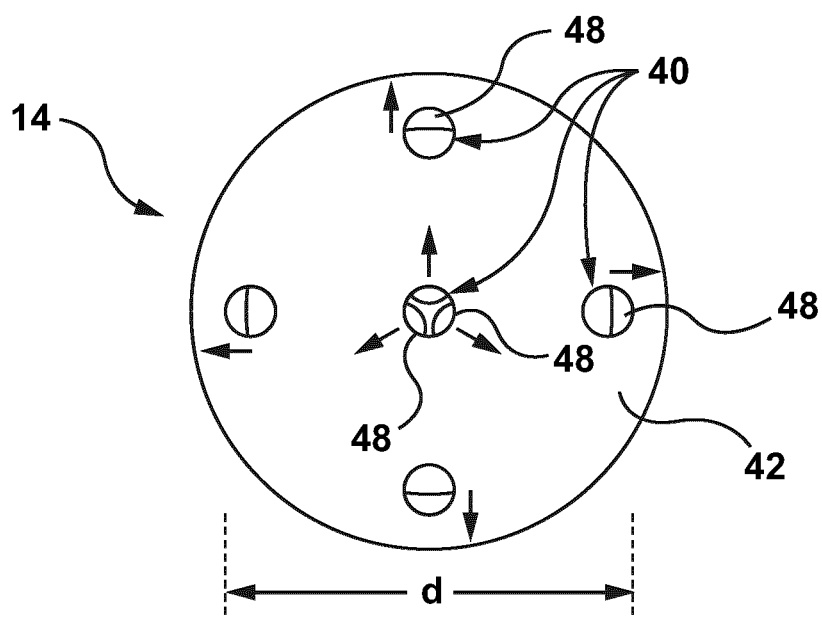
FIG. 3 is a bottom view of an injection system for the capsule machine of FIG. 1.

Referring to FIG. 3, injection system 14 includes a body having a plurality of injection nozzles 40 protruding from one side. In one embodiment, injection nozzles 40 are connected by a manifold 42 to a fluid transfer system 44. Fluid transfer system 44 is adapted to transfer a desired volume of fluid at a desired temperature to injection system 14. A control system 46 that is connected to control interface 20 may be utilized to control the operation of fluid transfer system 44 when a capsule 22 is loaded into brew chamber 16.

Injection nozzles 40 are arranged on manifold 42 in a pattern that is adapted to distribute fluid in a desired manner to mix with ingredients 32. Each injection nozzle 40 includes one or more openings 48 that are adapted to direct fluid from injection nozzle 40 in a desired direction into capsule 22. The pattern of multiple injection nozzles 40 may be arranged such that the respective openings 48 of the injection nozzles 40 direct fluid in a desired manner to mix with ingredients 32.

In one embodiment, as shown in FIG. 3, injection nozzles 40 are disposed over an area that fits within the diameter d of lid 26 for smaller capsule 22b. This embodiment allows injection system 14 to work with capsule sizes ranging from smaller capsules 22b to relatively larger size capsules 22a. Injection nozzles 40 that are disposed along the outer perimeter of injection system 14 may be arranged with openings 48 that direct fluid outwardly towards the side wall 28 of capsule 22. This improves the fluid distribution in capsules 22a and 22b. Alternatively, openings 48 may be oriented to direct fluid in a tangential direction (not shown) to create a swirling motion within capsules 22a and 22b. Openings 48 may also be directed at a downward angle (not shown) relative to lid 26 to improve agitation and wetting within capsules 22a and 22b. The downward angle preferably being between 30 and 70 degrees, and more preferably between 40 and 60 degrees.

Figure 4:
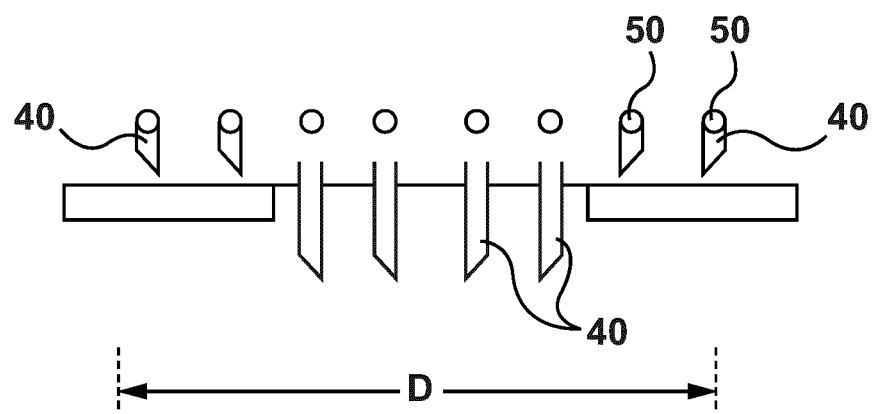
FIG. 4 is a sectional view of another embodiment of injection system for the capsule machine of FIG. 1.

In another embodiment, as shown in FIG. 4, injection nozzles 40 are disposed over an area that fits within the diameter D of lid 26 for larger capsule 22a. Injection nozzles 40 may include a valve 50 that is adapted to open or close depending upon the size of capsule 22 that is disposed within brew chamber 16.

Figure 5:
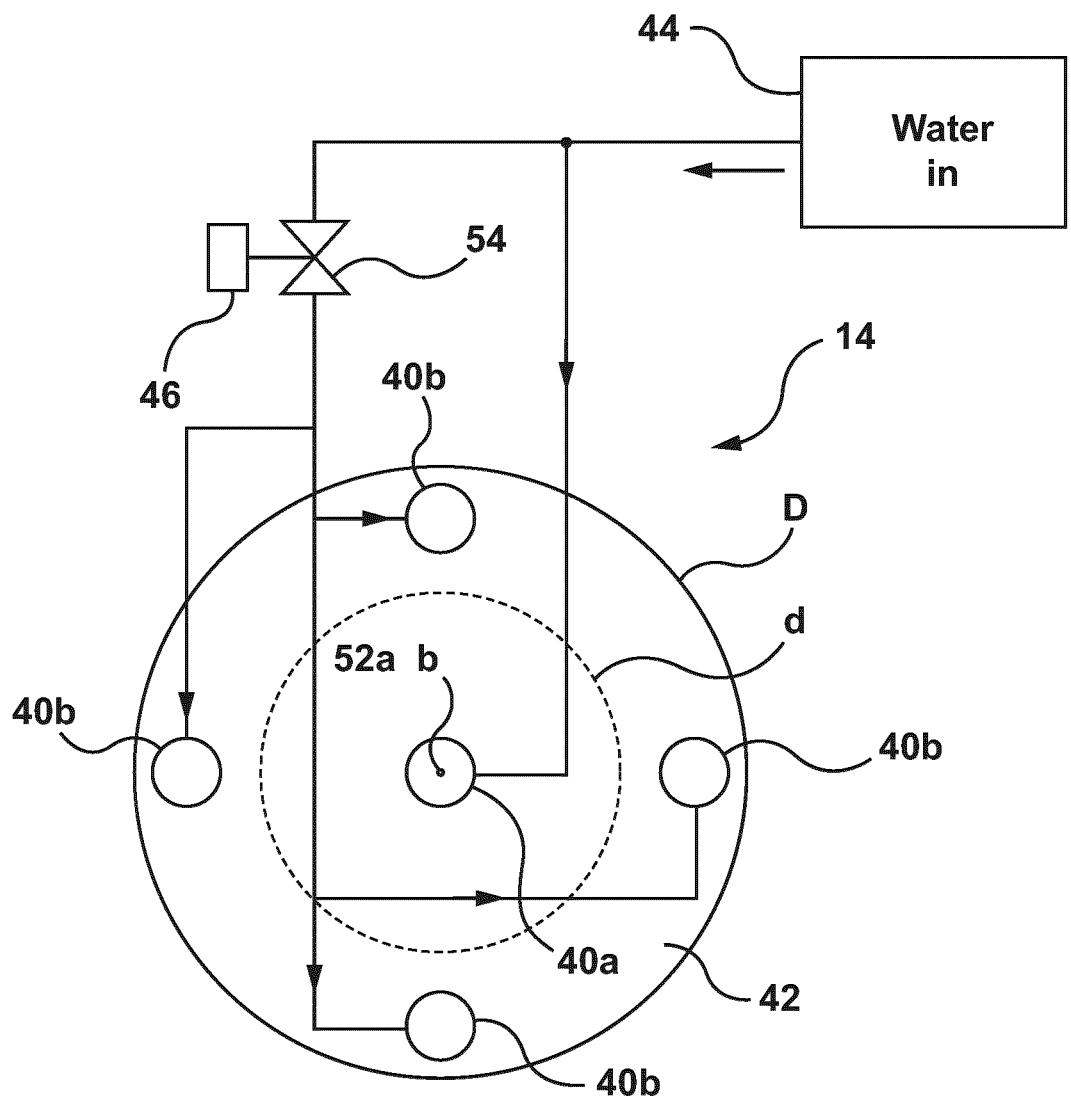
FIG. 5 is a schematic view of another embodiment of injection system for the capsule machine of FIG. 1.

In another embodiment, as shown in FIG. 5, injection system 14 may be provided with one or more first injection nozzles 40a and one or more second injection nozzles 40b. First injection nozzles 40a are adapted for injecting fluid into a first location within a capsule 22 such as a location disposed within the diameter d of lid 26 for a smaller sized capsule 22b (in this embodiment, a single first injection nozzle 40a is disposed along a central axis 52b of capsule 22b). Second injection nozzles 40b are adapted for injecting fluid into a second location within a capsule 22 such as a location disposed within diameter D of lid 26 for a larger sized capsule 22a (in this embodiment, a plurality of second injection nozzles 40b are disposed around the central axis 52a of capsule 22a between diameter D and diameter d of lid 26).

Injection system 14 further includes a valve 54 controlled by control system 46 for controlling the flow of fluid to first injection nozzle 40a and second injection nozzles 40b.

Figure 6:
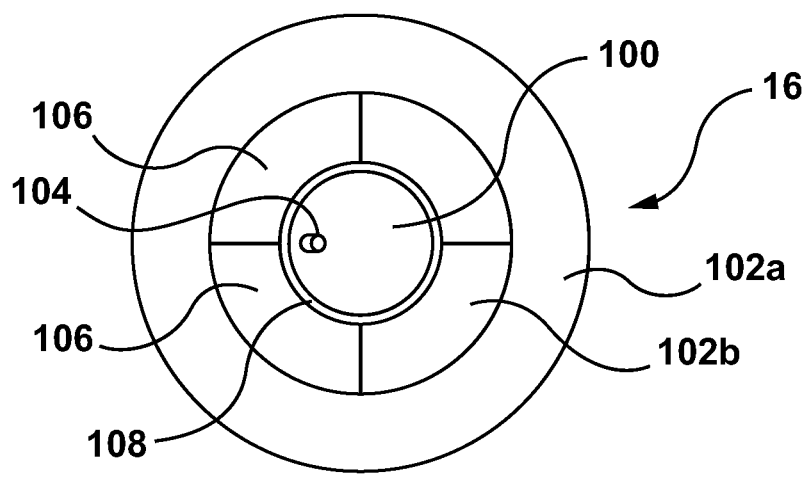
FIG. 6 is a top view of a brew chamber for the capsule machine of FIG. 1.
Figure 7A:
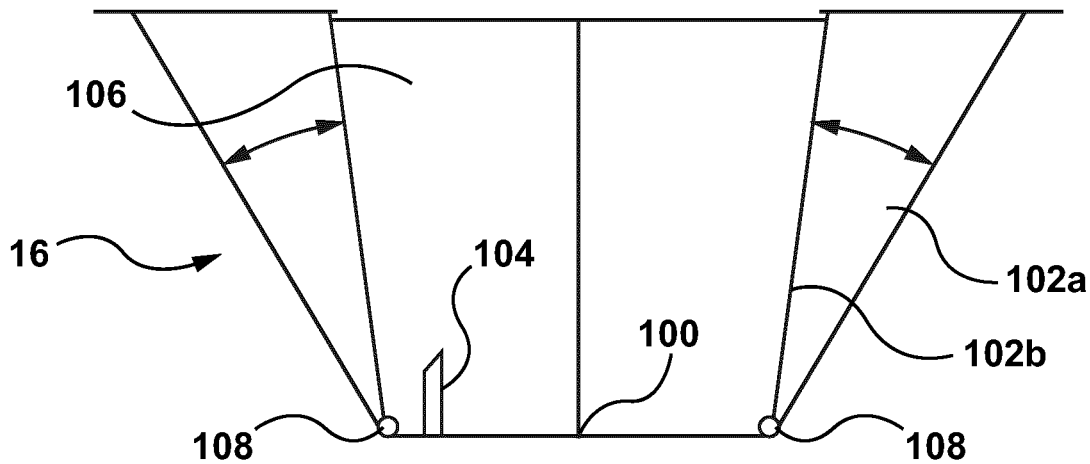
FIGS. 7a and 7b are sectional views of the brew chamber of FIG. 6 showing the smaller and larger size capsule configurations respectively.
Figure 7B:
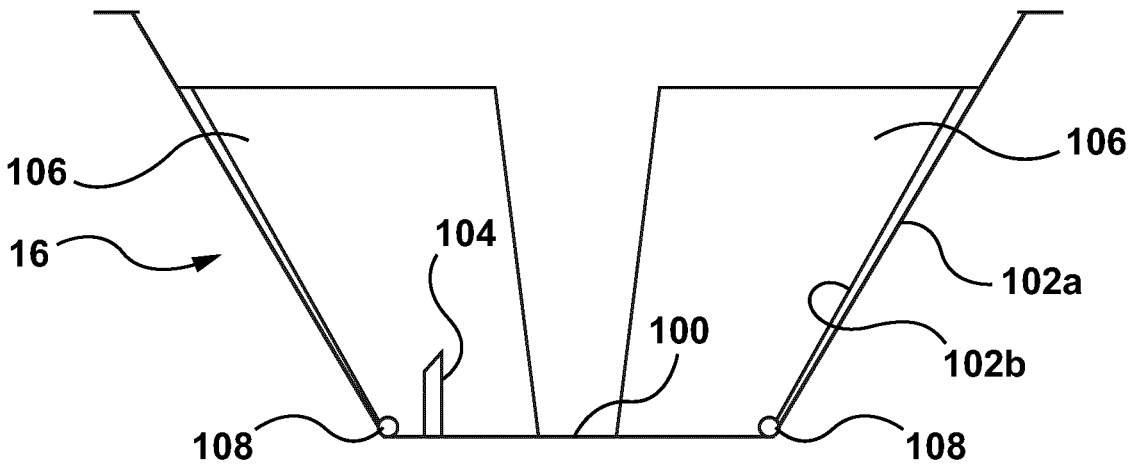
Figure 8:
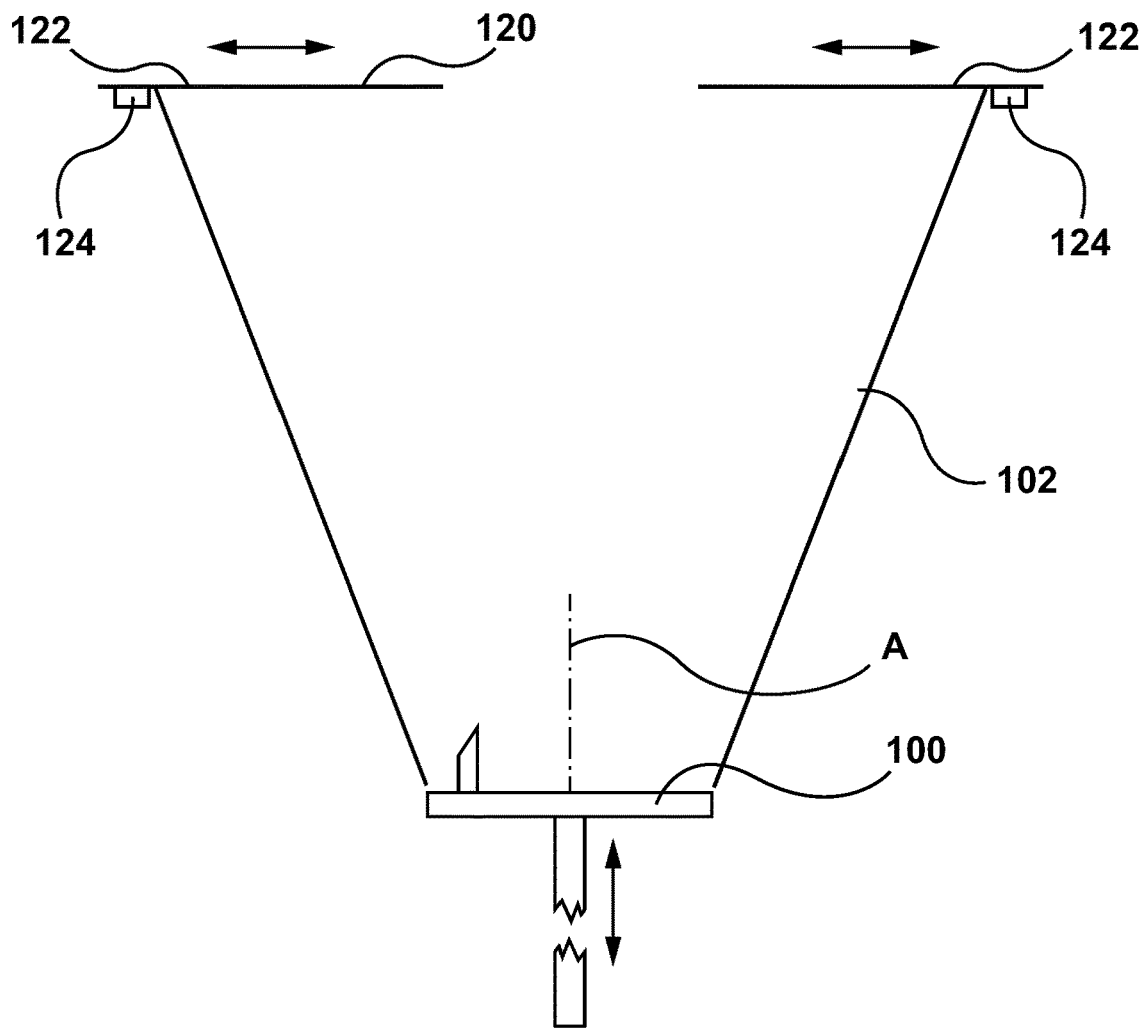
FIG. 8 is a side sectional view of another embodiment of brew chamber for the capsule machine of FIG. 1.

Referring to FIGS. 6, 7a and 7b, brew chamber 16 includes a base 100 and side wall 102. In one embodiment, dispensing system 18 includes one or more dispensing probes 104 that protrude inwardly from base 100 into brew chamber 16. Dispensing probes 104 are adapted to pierce base 30 of a capsule 22 disposed in brew chamber 16.

Brew chamber 16 is adapted to receive capsules 22 of different sizes. In one embodiment, side wall 102 has a fixed portion 102a and a moveable portion 102b formed by a plurality of panels 106 connected to base 100 by a hinge 108. Moveable portion 102b is adapted to move in accordance with the different size of capsule 22 disposed in brew chamber 16 up to a point where panels 106 lay against fixed portion 102a.

Figure 9:
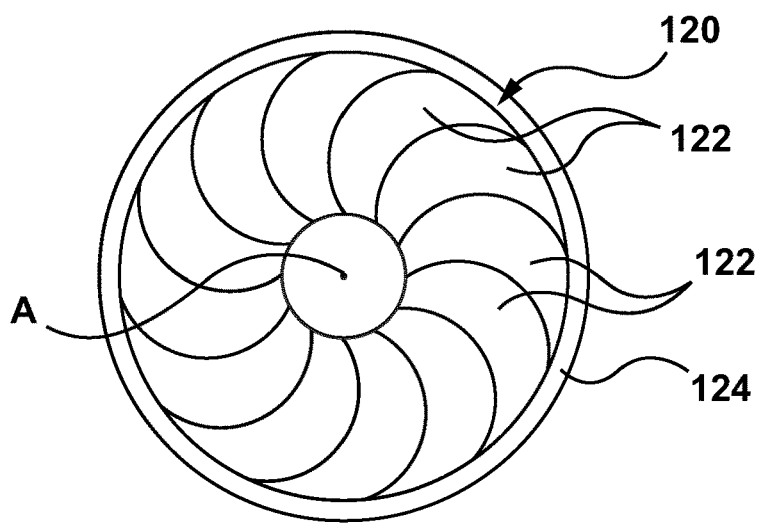
FIG. 9 is a top view of an adjustable shoulder for the brew chamber of FIG. 8.

In another embodiment, as shown in FIGS. 8, 9, 10a and 10b, brew chamber 16 has a moveable base 100, a fixed side wall 102 and an adjustable shoulder 120. Adjustable shoulder 120 is adapted to change diameter in accordance with the diameter of the rim of capsule 22. Preferably, adjustable shoulder 120 is spring biased inwardly toward a central axis A of brew chamber 16. In one embodiment, as shown in FIG. 9, adjustable shoulder 120 comprises a plurality of blades 122 that are pivotally connected to an outer ring 124 to pivot outwardly relative to the central axis A of brew chamber 16 in a plane that is perpendicular to central axis A similar to a diaphragm shutter of a camera lens. Blades 122 are shaped to together form a generally circular shoulder 120 of varying diameter depending on the degree to which blades 122 are pivoted relative to ring 124.

Figure 10A:
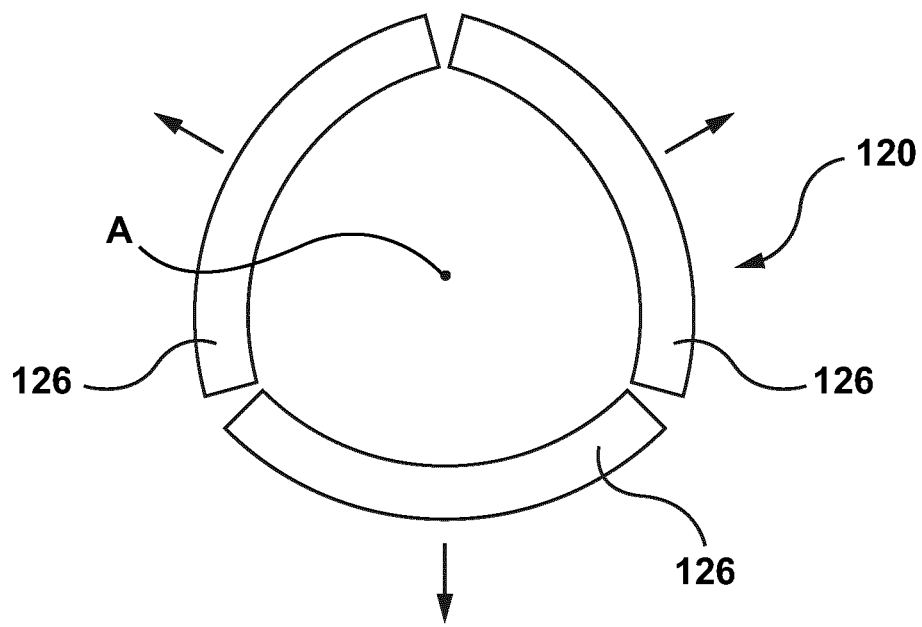
FIGS. 10a and 10b are top views of another embodiment of adjustable shoulder for the brew chamber of FIG. 8 in first and second positions.
Figure 10B:
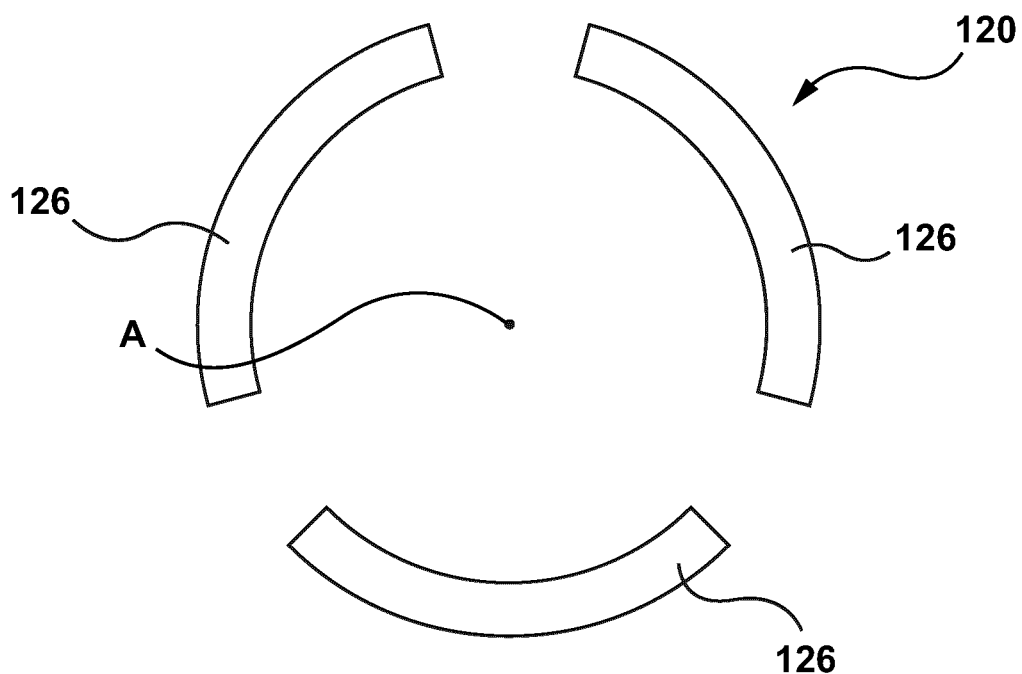

In another embodiment, as shown in FIGS. 10a and 10b, adjustable shoulder 120 comprises a plurality of shoulder portions 126 that are adapted to slide outwardly relative to the central axis A of brew chamber 16 in a plane that is perpendicular to central axis A.

When capsule 22 is disposed in brew chamber 16, side wall 28 of capsule engages adjustable shoulder 120 and causes adjustable shoulder to move outwardly while remaining in engagement with side wall 28. Adjustable shoulder 120 stops moving once rim of capsule 22 engages adjustable shoulder 120.

Referring back to FIG. 8, once capsule 22 is disposed in brew chamber 16, moveable base 100 is engaged under control of control system 46 to pierce base 30 of capsule 22. In this manner, capsules 22 of varying diameters and depths may be disposed in brew chamber 16.

Referring to FIGS. 11a, 11b and 11c, another embodiment of brew chamber 16 is shown. In this embodiment, brew chamber 16 is provided with a first dispensing probe 104a disposed on a first base portion 100a and a second dispensing probe 104b disposed on a second base portion 100b. Brew chamber 16 further includes a side wall 102 that includes a moveable portion 130 that supports first base portion 100a and first dispensing probe 104a. Moveable portion 130 is connected by a hinge 132 to an upper portion of brew chamber 16 and spring biased inwardly toward central axis A of brew chamber 16. Moveable portion 130 is adapted to move outwardly a sufficient amount to allow a larger size capsule 22 to be inserted into brew chamber 16 into engagement with second dispensing probe 104b. Moveable portion 130 may be connected to a lever 134 to manually adjust brew chamber 16 to receive a regular size capsule (engaged by dispensing probe 104a) or a larger sized capsule (engaged by dispensing probe 104b).

Figure 12A:
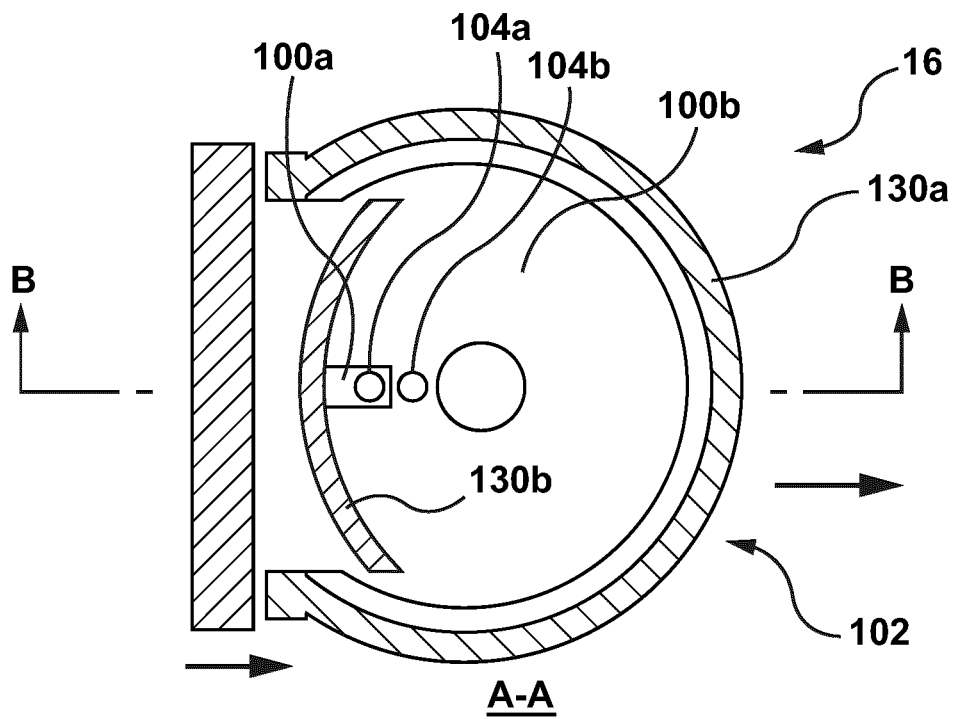
FIG. 12a is a top view of another embodiment of brew chamber for the capsule machine of FIG. 1.
Figure 12B:
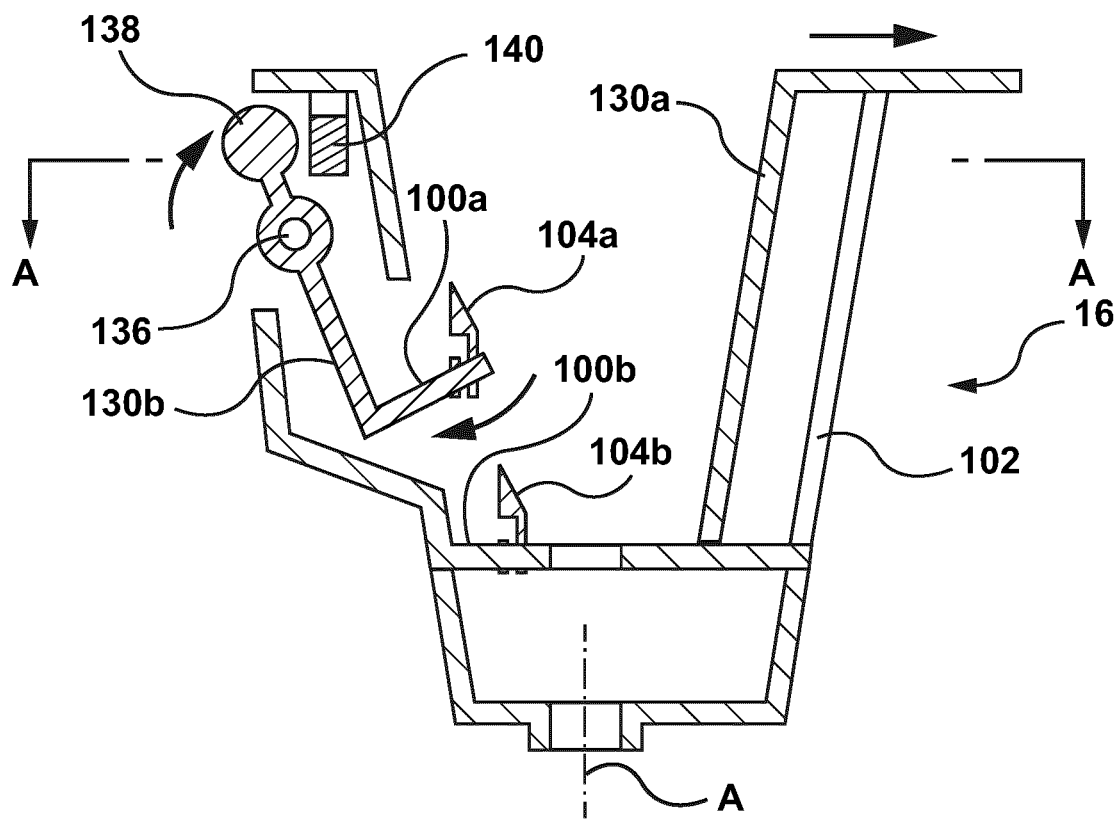
FIG. 12b is a sectional view of the brew chamber of FIG. 12a as viewed along line B-B.

Referring to FIGS. 12a and 12b, another embodiment of brew chamber 16 is shown. In this embodiment, brew chamber 16 is again provided with a first dispensing probe 104a disposed on a first base portion 100a and a second dispensing probe 104b disposed on a second base portion 100b. Brew chamber 16 further includes a sidewall 102 having a first movable portion 130a and a second movable portion 130b. First moveable portion 130a is preferably spring biased inwardly toward central axis A of brew chamber 16. Second movable portion 130b is pivotable around a pin 136 and preferably spring biased to allow a head 138 disposed on second movable portion 130b to remain in contact with a collar 140 disposed on first movable portion 130a. When a capsule 22 is loaded into brew chamber 16, first movable portion 130a is adapted to move outwardly in accordance with the size of the capsule 22. First dispensing probe 104a is adapted to engage a capsule 22 having a first (smaller) size. If a sufficiently larger size capsule 22 is loaded into brew chamber 16, first movable portion 130a is adapted to move sufficiently outwardly that it causes second movable portion 130b to move first dispensing probe 104a out of contact with capsule 22 and allow second dispensing probe 104b to engage the capsule 22.

Figure 13:
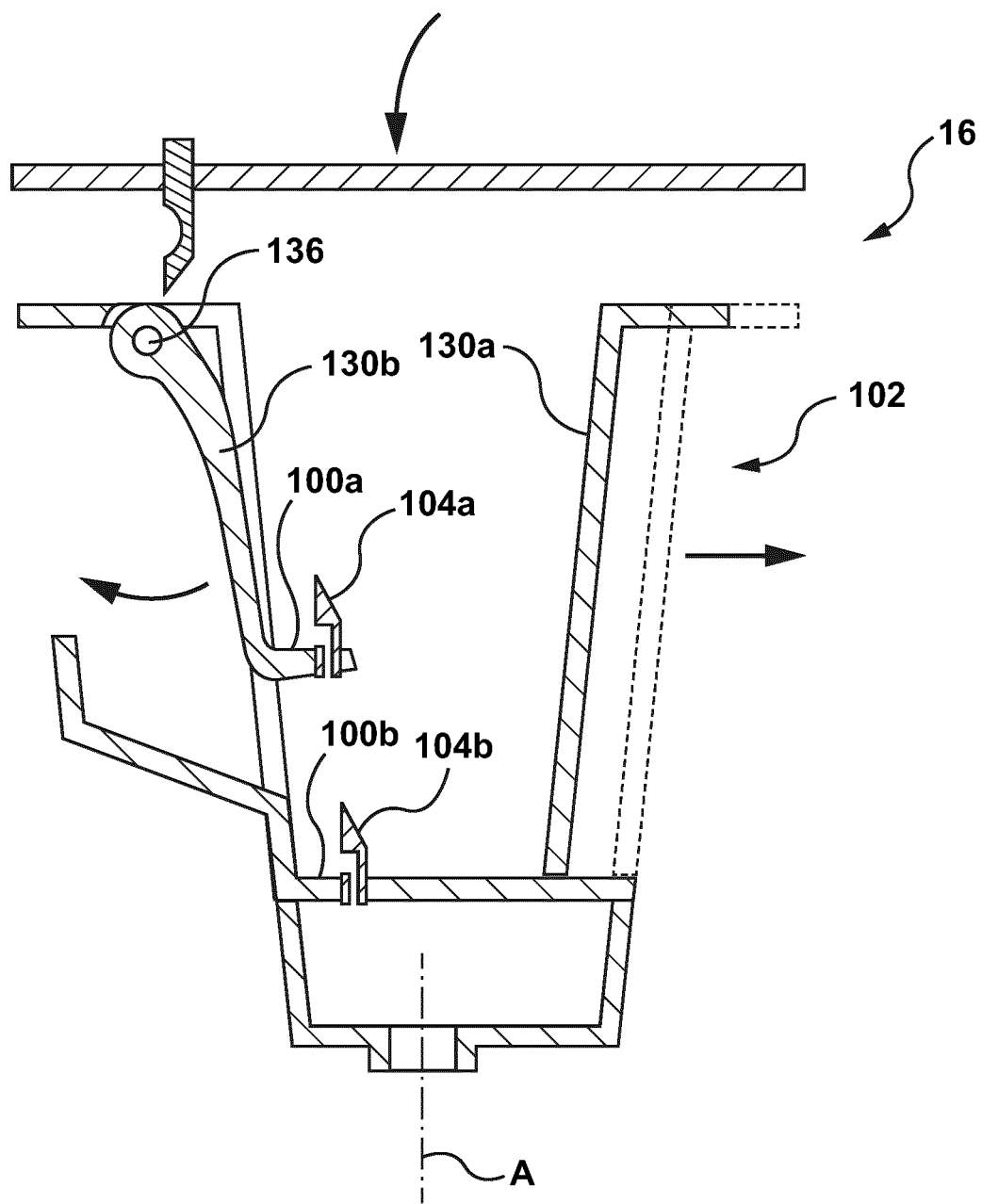
FIG. 13 is a side sectional view of another embodiment of brew chamber for the capsule machine of FIG. 1.

Referring to FIG. 13, another embodiment of brew chamber 16 is shown. In this embodiment, brew chamber 16 is again provided with a first dispensing probe 104a disposed on a first base portion 100a and a second dispensing probe 104b disposed on a second base portion 100b. Brew chamber 16 further includes a sidewall 102 having a first movable portion 130a and a second movable portion 130b. First moveable portion 130a and second moveable portion 130b are preferably spring biased inwardly toward central axis A of brew chamber 16. In this embodiment, second movable portion 130b is adapted to move upon engagement with one or more bosses or protrusions defined on capsule 22 (such as the protrusions disposed on the Keurig Vue™ style of capsule).

Figure 14:
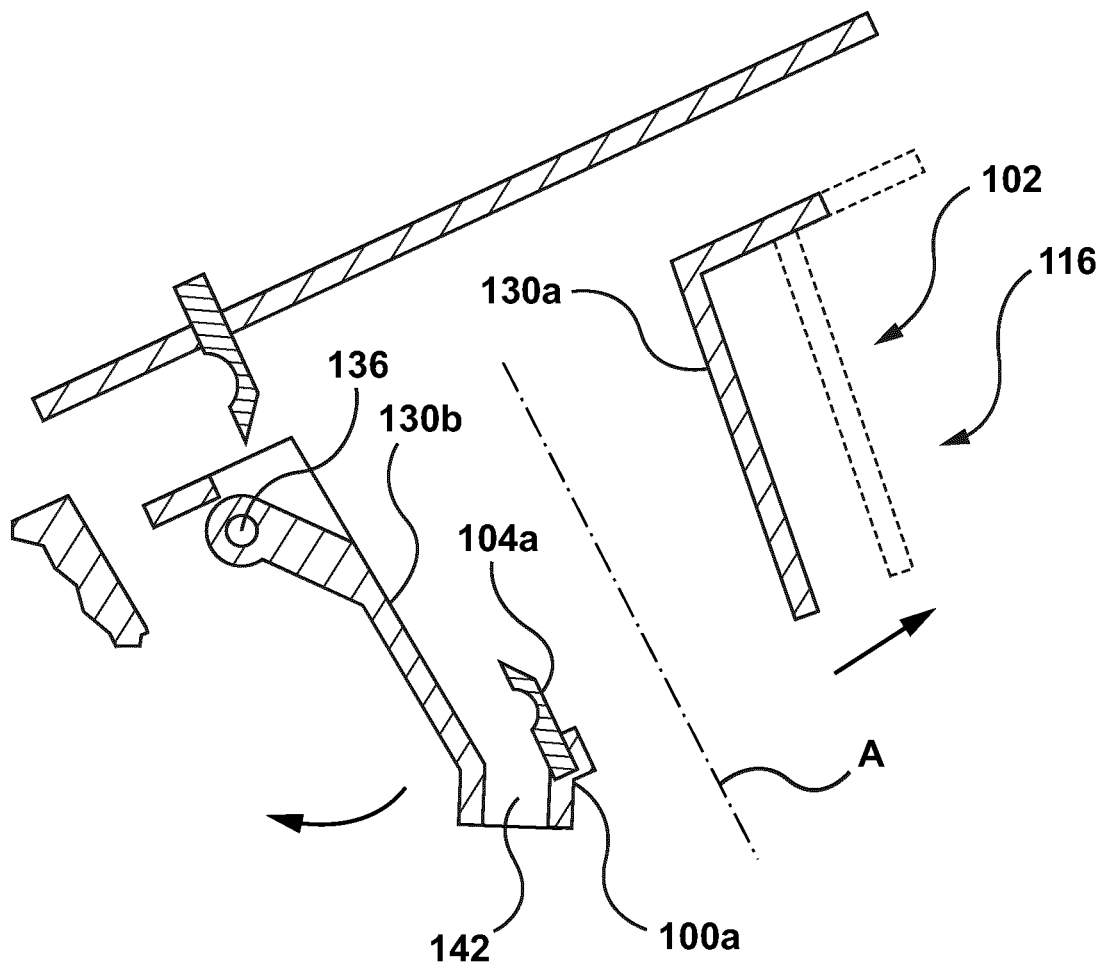
FIG. 14 is a side sectional view of another embodiment of brew chamber for the capsule machine of FIG. 1

Referring to FIG. 14, another embodiment of brew chamber 16 is shown. This embodiment is similar to the embodiment shown in FIG. 13 but is adapted for use at an inclined angle. In this instance, second movable portion 130b includes a dispensing aperture 142 associated with first dispensing probe 104a that is adapted to dispense prepared product from capsule 22 to a desired receptacle. If a capsule 22 is loaded into brew chamber 16 with bosses or protrusions that move second movable portion 130b sufficiently outwardly, then second dispensing probe (not shown) may be provided to engage capsule 22 for dispensing prepared product through an aperture defined in the base of brew chamber 16.

While the above description provides examples of one or more processes or apparatuses, it will be appreciated that other processes or apparatuses may be within the scope of the accompanying claims.

We claim:

1. A machine for preparing a product from a capsule that contains desired ingredients, the machine comprising:
 a housing;
 a brew chamber adapted for holding a capsule, said brew chamber being adapted to change diameter in accordance with the diameter of the capsule;
 an injection system adapted for injecting a fluid into said capsule, said injection system having a plurality of injection nozzles that are each adapted for piercing a lid of said capsule; and
 a fluid transfer system adapted for transferring a desired fluid from a fluid source to said injection system,
 wherein at least some of said injection nozzles include a valve that is adapted to open or close to control the injection of fluid from said at least one nozzle.

2. The machine of claim 1, wherein said injection system further includes a manifold that is connected to said fluid transfer system, said manifold being adapted to distribute said fluid to said plurality of injection nozzles.

3. The machine of claim 1, wherein each said injection nozzle includes at least one opening that is adapted to inject fluid into said capsule in a desired direction.

4. The machine of claim 3, wherein at least some of said injection nozzles are adapted to inject fluid into said capsule outwardly towards a side wall of said capsule.

5. The machine of claim 3, wherein at least some of said injection nozzles are adapted to inject fluid into said capsules in a tangential direction to create a swirling pattern within said capsule.

6. The machine of claim 1, further comprising a dispensing system adapted for dispensing product from said capsule to a desired.

7. The machine of claim 1, wherein said valve is adapted to open or close depending on the diameter of capsule that is disposed in the brew chamber.

8. A machine for preparing a product from a capsule that contains desired ingredients, the machine comprising:
 a housing;
 a brew chamber adapted for holding a capsule, said brew chamber being adapted to change diameter in accordance with the diameter of the capsule;
 an injection system adapted for injecting a fluid into said capsule, said injection system having a plurality of injection nozzles that are each adapted for piercing a lid of said capsule; and a fluid transfer system adapted for transferring a desired fluid from a fluid source to said injection system, wherein said injection system includes at least one first injection nozzle, adapted for injecting fluid into a first location within a capsule, and at least one second injection nozzle, adapted for injecting fluid into a second location within a capsule, and wherein said injection system includes a valve adapted for controlling the flow of fluid to the first and second injection nozzles.

9. The machine of claim 8, wherein said injection system further includes a manifold that is connected to said fluid transfer system, said manifold being adapted to distribute said fluid to said plurality of injection nozzles.

10. The machine of claim 8, wherein each said injection nozzle includes at least one opening that is adapted to inject fluid into said capsule in a desired direction.

11. The machine of claim 10, wherein at least some of said injection nozzles are adapted to inject fluid into said capsule outwardly towards a side wall of said capsule.

12. The machine of claim 10, wherein at least some of said injection nozzles are adapted to inject fluid into said capsules in a tangential direction to create a swirling pattern within said capsule.

13. The machine of claim 8, further comprising a dispensing system adapted for dispensing product from said capsule to a desired.

14. The machine of claim 8, wherein at least some of said injection nozzles include a valve that is adapted to open or close to control the injection of fluid from said at least one nozzle.

15. The machine of claim 14, wherein said valve is adapted to open or close depending on the diameter of capsule that is disposed in the brew chamber.

16. A machine for preparing a product from a capsule that contains desired ingredients, the machine comprising:
 a housing;
 a brew chamber adapted for holding a capsule, said brew chamber including at least one movable portion that is adapted to move to receive different sizes of capsules;
 an injection system adapted for injecting a fluid into said capsule;
 a fluid transfer system adapted for transferring a desired fluid from a fluid source to said injection system; and
 a dispensing system adapted for dispensing product from said capsule to a desired receptacle
 wherein said at least one movable portion includes a moveable base that is adapted to move in order to receive different sizes of capsules.

17. The machine of claim 16, wherein said at least one movable portion includes a movable side wall having a fixed portion and a moveable portion, the moveable portion being adapted to move to receive different sizes of capsules.

18. The machine of claim 16, wherein said brew chamber includes an adjustable shoulder that is adapted to change diameter in accordance with the diameter of capsule disposed in said brew chamber.

19. The machine of claim 18, wherein said adjustable shoulder comprises a plurality of blades that are adapted to pivot outwardly relative to a central axis of said brew chamber.

20. The machine of claim 18, wherein said adjustable shoulder comprises a plurality of shoulder portions that are adapted to slide outwardly relative to a central axis of said brew chamber.

21. The machine of claim 16, further comprising a dispensing system adapted for dispensing product from said capsule to a desired receptacle.

22. The machine of claim 16, wherein said moveable base includes a probe that is adapted for piercing said capsule for dispensing product from said capsule to a desired receptacle.

23. The machine of claim 16, wherein said moveable base includes a first probe, adapted for piercing a first size of capsule, and a second probe, adapted for piercing a second size of capsule, said first and second probes being adapted for dispensing product from said capsule to a desired receptacle.

24. The machine of claim 16, wherein said moveable portion is adapted to move upon engagement with a boss or protrusion defined on a capsule.

* * * * *